Joseph Potter & Olif. Abell's Imp.d
Boxed Hone.

No. 73383

PATENTED
JAN 14 1868

Witnesses:
Theo Inscho
Wm. Tuurn

Inventor:
Joseph Potter
Olif Abell
Per Munn
Attorneys

United States Patent Office.

JOSEPH POTTER AND OLIF ABELL, OF WHITEHALL, NEW YORK.

Letters Patent No. 73,383, dated January 14, 1868.

IMPROVED BOXED HONE.

*The Schedule referred to in these Letters Patent and making part of the same.*

TO ALL WHOM IT MAY CONCERN:

Be it known that we, JOSEPH POTTER and OLIF ABELL, of Whitehall, Washington county, New York, have invented a new and improved Boxed Hone or Grinding-Material; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a new manner of setting or encasing hone and other grinding-material, so that it may be brought to market in such a manner that it will be well protected, and that it may be handled with ease.

The invention consists in encasing the hone or whetstone, or other grinding-material, in a wooden or other cylindrical box, in such a manner that its grinding-surface projects above the box, and so that it cannot fall out or be easily removed from the box, and in providing a cover for the said box, whereby the grinding-surface of the hone may be protected from injury by falls, or from dust and impurities, by which it may be made unfit for sharpening fine instruments. The stone having a circular surface, is more apt to be always kept level than the ordinary long stones, in which depressions are soon formed.

This invention is particularly applicable for sharpening razors, pocket-knives, dental and surgical instruments, needles, and other similar articles.

Figure 1:
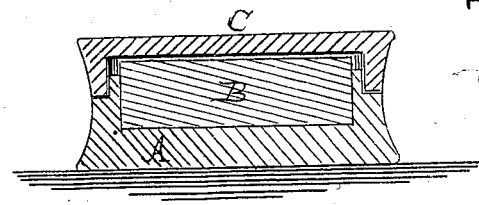
Figure 1 represents a vertical sectional view of our invention.
Figure 2:
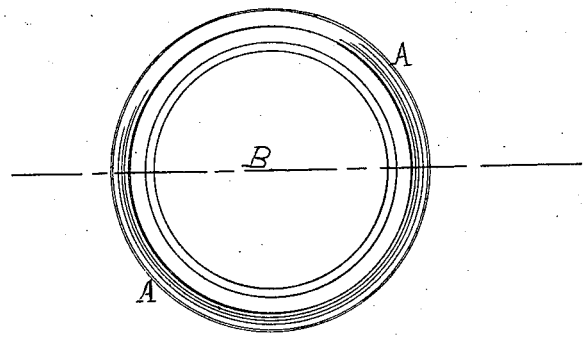
Figure 2 is a plan or top view of the same, the cover being removed.

A represents a box, which is of round shape, and which may be made of wood, or other suitable material. B is a piece of hone or other grinding-material, and of the same shape as the box A, and is firmly secured in the same, so as to project above it, as shown in fig. 1. C is the cover, made to fit over the box A, as shown in fig. 1, and made of wood or other suitable material.

Having thus described our invention, what we claim as new, and desire to secure by Letters Patent, is—

As a new article of manufacture, the circular hone, encased in a circular wooden box, having wooden cover C, in such a manner as to protect the hone and keep its upper surface level, or from having depressions formed therein by the action of the tool being ground, as herein shown and described.

The above specification of our invention, signed by us, this 15th day of April, 1867.

JOSEPH POTTER,
OLIF ABELL.

Witnesses:
WM. F. McNAMARA,
ALEX. F. ROBERTS.